Feb. 7, 1967       P. J. SIX       3,302,518
OPTICAL WEIGHING MACHINE
Filed Oct. 5, 1964
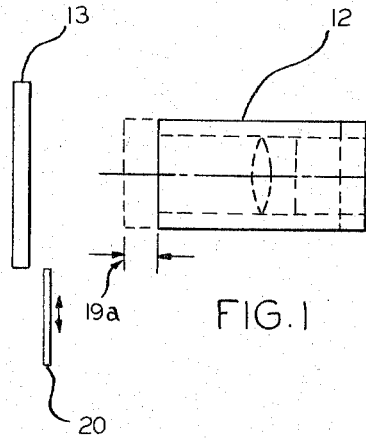
FIG.1
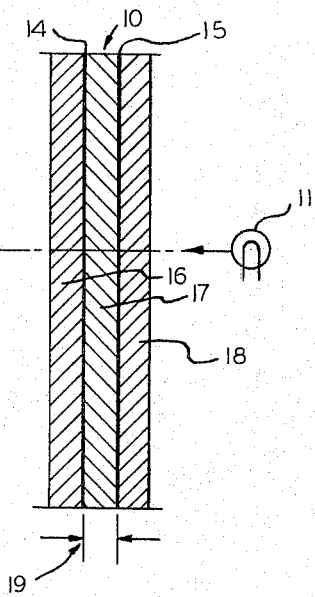
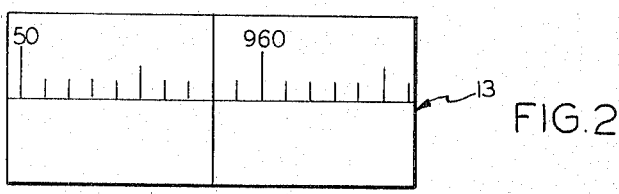
FIG.2
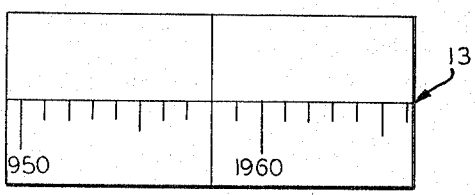
FIG.3
FIG.4
FIG.5
INVENTOR
PIETER JACOB SIX
BY
*Mayall, Johnston, Cook & Root*
ATTORNEYS United States Patent Office 3,302,518
Patented Feb. 7, 1967

3,302,518
OPTICAL WEIGHING MACHINE
Pieter Jacob Six, Wassenaar, Netherlands, assignor to Maatschappij Van Berkel's Patent N.V., Rotterdam, Netherlands, a limited-liability company of the Netherlands
Filed Oct. 5, 1964, Ser. No. 401,422
Claims priority, application Germany, Oct. 8, 1963, M 58,454
3 Claims. (Cl. 88—24)

This invention relates in general to an optical weighing apparatus, and more particularly to an optical weighing apparatus having a device for reading out data in response to goods weighed by the apparatus, and still more particularly to a read out device for optical weighing apparatus capable of increasing the capacity of data to be read out, and thereby increasing the capacity of the weighing apparatus.

It is well known to provide a weighing apparatus having a read out device wherein data is taken from the apparatus in response to the goods weighed thereby including the weight and a computed price. It is also well known that such devices include glass scales having data thereon and from which the data is projected onto a screen that can be observed by the operator. However, the amount of information or data heretofore placed on a scale and projected onto a screen with an objective lens has been limited, thereby limiting the capacity of the weighing apparatuses. However it is well known also that in a system of the type described, the capacity of the apparatus may be increased once by covering one-half of the screen and permitting the objective lens to project two scales onto the screen and thereby allowing only one of the scales to be viewed at any one time by the operator.

It is therefore an object of the present invention to provide a weighing apparatus having increased capacity, wherein the capacity may be increased any number of times by employing the device of the present invention.

A further object of this invention resides in the provision of a device for reading out data in a weighing apparatus, wherein the device is capable of increasing the capacity of the machine and the capacity to provide read out data by several times.

A still further object of this invention is in the provision of a device for reading out data from an optical weighing apparatus including a transparent scale having a plurality of parallel spaced image planes of data, a screen, and an objective lens movable to be focused on any one of the image planes thereby permitting the data of only one plane to be projected onto the screen at any one time.

Other objects, features and advantages of the invention will be apparent from the following detailed disclosure, taken in conjunction with the accompanying sheet of drawing, wherein like reference numerals refer to like parts, in which:

FIG. 1 is a diagrammatic view of a device for reading out data on a weighing apparatus in accordance with the present invention; and FIGS. 2, 3, 4 and 5 are views of the screen having data projected thereon from the image planes and wherein half of the screen is covered for varying the information projected thereon.

Referring now to the drawings, and particularly to FIG. 1, the read out device of the present invention includes a transparent scale 10 having a light source 11 on one side for projecting light therethrough, an objective lens 12 on the other side of the scale 10 for projecting an image received from the scale 10 onto a screen 13. It should be understood that the scale 10 and the objective lens 12 move in response to the goods weighed on the weighing apparatus in order to project the proper data onto the screen 13. Moreover, it should be appreciated that the data on the scale 10 may be the weight of the goods weighed or alternatively the computed price of the goods being weighed based upon the weight and a price per pound.

The transparent scale 10 is preferably of glass and includes a pair of image planes of data 14 and 15 arranged in parallel spaced relation and sandwiched between transparent plates of material 16, 17 and 18. The plates 16, 17 and 18 may be of glass, plastic or any other suitable transparent material, and they serve to keep the image planes 14 and 15 free of dust and unwanted material. Also the center plate 17 serves to space the image planes 14 and 15 apart a distance equal to that indicated by the arrows and lines 19. For example, the thickness of the center plate 17 may be on the order of one to two millimeters, although this thickness may vary depending upon the manufacture of the device. Further, it should be appreciated that more than two image planes may be provided if it is desired to further increase the capacity of a weighing apparatus.

The objective lens 12 is designed to have a very low depth of field or focus, such as when having a magnification of between twenty and fifty times, so that the image to be projected by the lens onto the screen 13 will only be in focus upon proper and accurate adjustment of the objective lens 12. In the embodiment illustrated, the objective lens 12 as shown in solid lines is for example in adjustment to project the data from the image plane 15 onto the screen 13 and therefore in focus with the image plane 15, while being out of focus for the image plane 14. Consequently, the data from the image plane 14 will not show on the screen 13. The objective lens 12 is axially movable along a line perpendicular to the image planes 14 and 15 when the objective lens moves to the position shown in dotted lines, a distance indicated by the arrows and lines 19a which is equal to the optical distance 19 between the image planes 14 and 15, the objective lens 12 is then in focus with the image plane 14 to project the image data therefrom onto the screen 13. In this position, the objective lens 12 is out of focus with respect to the image plane 15, and therefore will not project the data from the image plane 15 onto the screen 13 so that it can be read. Therefore, two different sets of data may be projected onto the screen 13 from the image planes 14 and 15. The data on the image planes may be provided in black figures and lines or in any suitable manner.

A cover member 20 is also provided in association with the screen 13 and movable to cover either the upper or lower half of the screen, depending upon the capacity desired for the weighing apparatus in accordance with the data to be read from one of the image planes 14 or 15. Thus, in the embodiment illustrated, the capacity may be increased three times since the objective lens 12 will project data of two different ranges from each of the image planes 14 and 15. For example, the data projected onto the screen 13 and shown in FIGS. 2 and 3 would be projected from one of the image planes, while the data projected onto the screen 13 as shown in FIGS. 2 and 3 would be projected from the other image plane. In FIG. 2, it will be appreciated that the cover member 20 will cover the lower half of the screen, while in FIG. 3 the cover member 20 covers the upper half of the screen and in each case leaving only half of the screen available and permitting only that data desired to be readable by the operator. Similarly, in FIG. 4, the cover member 20 covers the lower half of the screen 13, while in FIG. 5, the cover member 20 covers the upper half of the screen 13.

In view of the foregoing, it is seen that by movement of the objective lens relative to the image planes, and by covering one-half of the screen, the operator may optically project data from one of the four capacity ranges. Therefore it can be appreciated that it is possible to increase the number of price columns for the different unit prices in computing weighing apparatuses, and/or to increase the weighing capacity.

It will be understood that modifications and variations may be effected without departing from the scope of the novel concepts of the present invention, but it is understood that this application is to be limited only by the scope of the appended claims.

The invention is hereby claimed as follows:

1. In combination with an optical weighing apparatus, a device for reading out data responsive to the weight of goods weighed by said apparatus, said device comprising a transparent scale having a plurality of image planes of data arranged in parallel spaced relation from each other, transparent means for spacing said image planes of data in said parallel spaced relation so that the image planes of data are in fixed position behind one another, means for directing a light source through said scale, a screen, and an objective lens having a very low depth of field movable along an axis extending perpendicular to said image planes of data in increments equal to the spacing between said image planes of data for selectively focusing on only one of said image planes of data at any one time and for transmitting that image plane of data onto said screen.

2. The combination as defined in claim 1, wherein said transparent means includes a transparent sheet of material between adjacent image planes of data, and transparent sheets of material are arranged on the other sides of each image plane of data.

3. The combination as defined in claim 1, and each image plane of data having upper and lower data to be transmitted to the screen, and means for selectively covering the upper and lower portions of said screen to selectively block transmission of the upper or lower data onto the screen.

References Cited by the Examiner

UNITED STATES PATENTS

| | | | |
|---|---|---|---|
| 2,392,461 | 1/1946 | Clifton et al. | 88—24 |
| 3,191,490 | 6/1965 | Rabinow | 88—24 |

NORTON ANSHER, *Primary Examiner.*

H. H. FLANDERS, *Assistant Examiner.*